United States Patent [19]

Zemel

[11] 4,453,405
[45] Jun. 12, 1984

[54] PYROELECTRIC VORTICIMETER

[75] Inventor: Jay N. Zemel, Jenkintown, Pa.

[73] Assignee: Trustees of the University of Pennsylvania, Philadelphia, Pa.

[21] Appl. No.: 381,344

[22] Filed: May 24, 1982

[51] Int. Cl.³ .............................................. G01F 1/68
[52] U.S. Cl. ...................................... 73/204; 310/306
[58] Field of Search ................... 73/189, 178 T, 204; 244/183; 364/428, 510; 310/306, 343

[56] References Cited

U.S. PATENT DOCUMENTS 3,519,924  7/1970  Burton .............................. 73/204 X
4,332,157  6/1982  Zemel et al. ........................... 73/204

Primary Examiner—Herbert Goldstein
Attorney, Agent, or Firm—Stanley C. Spooner

[57] ABSTRACT

Disclosed is a pyroelectric shear meter which can be utilized as a pyroelectric vorticimeter in which a pyroelectric substrate has a heater element located thereon and two conductor elements located adjacent the heater element. The conductor elements are spaced apart along the longitudinal axis of the heater element and located on the same side of the longitudinal axis. A fluctuating power supply is connected to the heater element causing a fluctuating surface charge distribution which varies as a function of the temperature of the substrate in the vicinity of each of the spaced apart conductor elements. Differences in charge redistributions sensed at each of the spaced apart conductor elements is an indication of the differences in flow velocity due to shear in the vicinity of the shear meter. The orienting of two shear meters with heating elements at 90° with respect to each other provides shear flow components in the X and Y directions and electrically multiplying the two shear flow components provides an electronic indication of the vorticity of the flow in the region of the pyroelectric substrate.

9 Claims, 4 Drawing Figures

PYROELECTRIC VORTICIMETER

BACKGROUND OF THE INVENTION

This application utilizes the techniques disclosed in copending U.S. patent application Ser. No. 182,683 filed Aug. 29, 1980, issuing as U.S. Pat. No. 4,332,157 on June 1, 1982, said application being herein incorporated by reference.

The present invention relates generally to the measurement of fluid flow fields and relates specifically to the measurement of vorticity in fluid flow fields.

The vorticity field is the primary dynamic variable of interest in many hydrodynamic situations, particularly in turbulent flow. It satisfies an equation that is (at least for incompressible flows) inherently simpler than the Navier-Stokes equations for the velocity field, and it is a quantity which is perhaps most directly related to the rate of local energy dissipation. Small scale vortices near the walls are believed to be responsible for the generation of turbulence in boundary layers. Numerical simulations of the structure and evolution of turbulent flow fields are often made in terms of the vorticity field.

In view of the apparent significance of the vorticity field in characterizing aerodynamic and hydrodynamic situations, very few direct measurements of vorticity have been made. The available methods generally require the use of small hot wire anemometers which require a substantial size (at least relative to the vorticity field of interest). Four wires are generally required to measure the two velocity derivatives needed to compute one component of local vorticity unless the flow is assumed to pass the observation area without change. At best the methods are complicated to use and are susceptible to error by all but the most experienced workers. One cause of error is the fact that where the velocity fluctuates over an area smaller than the size of the probe, the resultant measurements will be in substantial error.

Other attempts to measure vorticity involve the use of a laser and Doppler anemometry. Others have attempted to dope the fluid to be measured with transparent spherical particles containing planar crystal mirrors and utilizing scattered laser light therefrom to determine the local rotation rates. Although this appears to be promising, it requires matching the index of refraction of the fluid to the particles suspended therein. Assuming good data is returned, the space and time resolution of this data may not be satisfactory in characterizing turbulent flows.

It is desirable for a vorticity probe to not only be useable in any fluid without a need for recalibration but that it should not rely on multiple probes or numerical differentiation to extract the vorticity information. Vortex velocity (vorticities) at least as large as 100 s$^{-1}$ should be readily measureable with a spatial resolution of less than 1 mm. It is also desirable that the flow be perturbed as little as possible and that time resolution shorter than 10$^{-2}$ seconds be readily attainable.

SUMMARY OF THE INVENTION

It is therefore an object of the present invention to provide a vorticity probe capable of directly providing an output indicative of vorticity in a given flow field.

It is a further object of the present invention to provide a vorticimeter useable in any fluid with vorticities as large as 100 s$^{-1}$, a spatial resolution of less than 1 mm and a time resolution shorter than 10$^{-2}$ seconds.

It is a still further object of the present invention to provide a vorticimeter which can be produced using microminiaturization techniques in order that large numbers of such devices can be located over a relatively small surface area to provide accurate data as to the distribution of vortices in turbulent flow, the relationship between vorticity and strain rate in the flow, and the dynamics of vortex interactions in simple shear flow.

The above and other objects are achieved in accordance with the present invention wherein a pyroelectric substrate is provided with at least a single conductor on one side and a heating element and dual conductors located on the other side. The heating element extends along the length of the substrate surface with two conductors extending adjacent the heater element. A time varying current is applied to the heater element generating a pulsating heat input to the pyroelectric substrate. Additionally, a time varying flow of the fluid will generate a pulsating heat input to the pyroelectric substrate. The substrate while being heated by the heater element is cooled by fluid flowing over the substrate (either over the planar connector on one side and/or over the heater and conductor elements on the other side). Due to the polarization of the substrate, charge distributions are formed in the vicinity of the conductors where the charge distribution is dependent upon the temperature of the pyroelectric substrate in the vicinity of the conductor. Thus, in a preferred embodiment, the difference in flow velocity in a direction directly from the heating element to the conductor is proportional to the shear component when divided by the separation distance between the two conductors. Thus, the electrical output is directly related to the shear of the flow field over the surface of the shear meter. In a preferred embodiment, two shear meters would be located at an angle of 90° with respect to each other and would provide complete information directly on the local vortex flow.

BRIEF DESCRIPTION OF THE DRAWINGS

A more complete appreciation of the invention, and many of the attendant advantages thereof, will be readily apparent as the same becomes better understood by reference to the accompanying drawings, wherein.

DETAILED DESCRIPTION OF PREFERRED EMBODIMENTS

Figure 1:
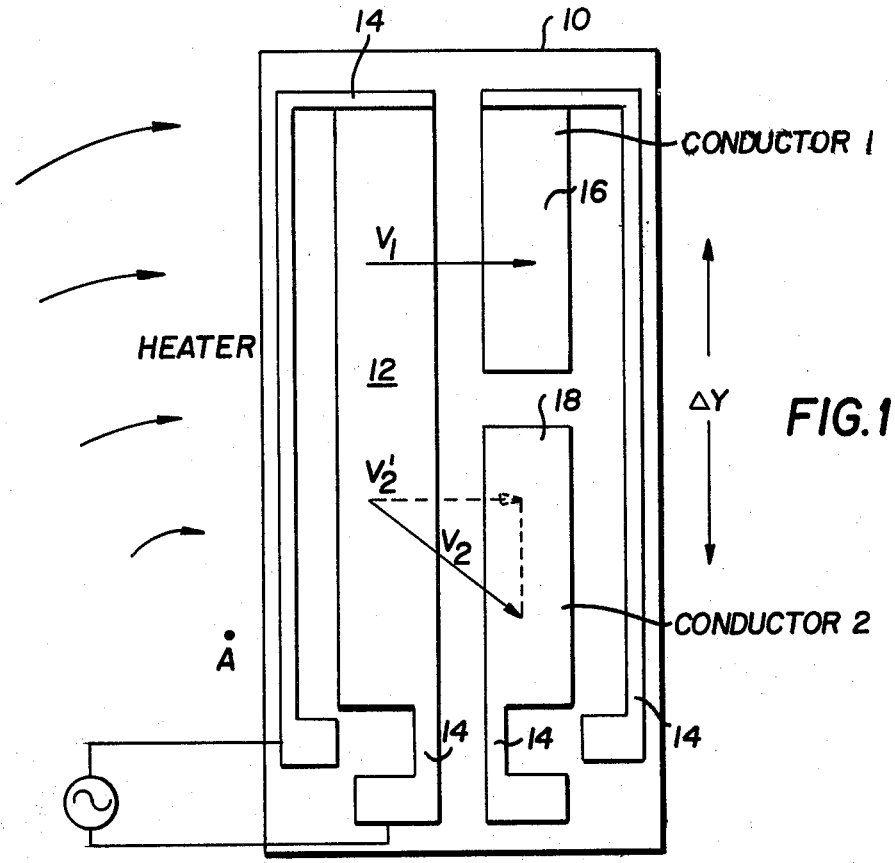
FIG. 1 is a top view of a shear meter in accordance with the present invention.

Referring now more particularly to the drawings, wherein like numerals represent like elements throughout the several views, FIG. 1 illustrates the arrangement of elements on one side of the pyroelectric substrate in accordance with the present invention. A pyroelectric substrate 10 as disclosed in the aforementioned patent application will produce a change in electric polarization based upon changes in temperature. In one embodiment a lithium tantalate plate which has been "z-cut" is used having a vapor deposited nickel chromium heater element 12 thereon. At either end of the heater element there may be aluminum conductive strips 14 which facilitate the application of electrical connections to the heater element.

At least two conductor elements 16 and 18 are disposed adjacent the heater element and have longitudinal axes which are parallel to the longitudinal axis of the heater element. The first and second conductor elements 16 and 18, respectively, have aluminum conducting strips 14 attached to one end thereof to also facilitate interconnection with other electronic devices. The two conductor elements have centroids which are separated by a distance delta Y. The opposite side of the pyroelectric substrate also includes a common conductor 20 which can be more clearly seen in FIG. 2.

By understanding the operation of the pyroelectric anemometer disclosed in the parent application, the operation of the pyroelectric shear meter will be clear with reference to FIG. 1. If a constant heat were applied by heater element 12, the pyroelectric substrate would heat up to some temperature which would be determined by the heat inputted by the heater element and the heat taken away from the substrate by the fluid field flowing thereover. This temperature change (due to heating) would cause a charge redistribution in the pyroelectric substrate which could be sensed by either the conductor element 1 or conductor element 2 in conjunction with the common conductor 20. However, in the event of a constant fluid flow field over the substrate and a constant heater input, the charge over a period of time would redistribute in the conductor elements back to a zero voltage. Therefore, as is taught in the parent application, it is desirable to apply a fluctuating heat input to heater element 12 such that the temperature of the pyroelectric substrate fluctuates and is constantly changing. The result of this fluctuation is a fluctuating charge redistribution which is sensed between either of the conductor elements and the common conductor. The charge redistribution which is sensed between the conductor element and the common conductor reflects the temperature changes which are occurring in the pyroelectric substrate which is sandwiched between the conductor element and the common conductor. Thus is can be seen that if the flow velocity over conductor element 1 differs from the flow velocity over conductor element 2 there will be a consequent difference in charge redistributions sensed between conductor elements and the common conductor 20. Of course, where flow field varies in velocity (as in a high speed or turbulent flow), the fluctuating heat input can be effected by a constant heat input with fluctuations in the cooling of the substrate.

Although the widths of the elements and the spacing between the heater element and the conductor elements are shown relatively large for purposes of illustration, it is understood that these dimensions are small relative to the length of the heater element 12. If this is true, fluid flow over the conductor elements, in a direction not perpendicular to the longitudinal axis of the heater element and conductor elements, will result in less cooling per thermal cycle of the heater and a consequently reduced signal output received by that conductor. This can be seen by reference to FIG. 1 where the flow between the heater element and the first conductor is in a direction indicated by arrow $V_1$ and is perpendicular to the longitudinal axis of the heater and the first conductor element. However, the flow over the second conductor element indicated by the arrow $V_2$ is not perpendicular to the longitudinal axis of the heater and second conductor elements. Therefore the effective cooling of the pyroelectric substrate in the vicinity of the conductor element 2 is given by dotted line arrow labeled $V_2'$ and will be less than that of $V_1$ even though in absolute terms the speed of $V_1$ may equal the speed of $V_2$. The velocities in a direction perpendicular to the axes of the elements $V_1$ and $V_2'$ generate signals on the conductor elements. The difference in the voltages is proportional to the difference in functions of the velocity $V_1$ and $V_2'$. Because each conductor element reflects the average charge redistribution over the substrate sandwiched between the conductor element and the common conductor, the centroid of the conductor is considered to be the effective point of measurement and thus the differential between signals picked up by conductor elements 1 and 2 is a function delta V over a distance delta y. Delta Y is a function of the separation distance of said conductor element.

Because delta V over delta Y is a function of the shear signal, the connection of the inputs of a differential amplifier to the outputs of the first and second conductor elements will provide an electronic indication of the shear in the flow passing over the shear meter of FIG. 1.

Figure 3:
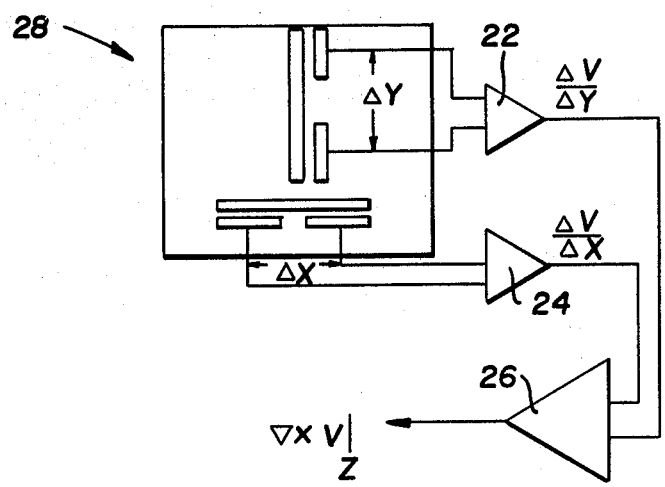
FIG. 3 is a top view of a vorticimeter showing the orientation of two shear meters at 90° with respect to each other.

If vortical flow is desired, a second shear sensor can be provided with heater and elements oriented 90° with respect to each other as is shown in FIG. 3. From this arrangement, both delta V over delta Y and delta V over delta X can be determined and the product of these two quantities is proportional to vorticity about the z axis (z axis being perpendicular to the x and y axes and the plane of the paper in FIG. 3). Thus as shown in FIG. 3, differential amplifiers 22 and 24 have their outputs subtracted in differential amplifier 26 whose output is a function of the vorticity in the fluid flow flowing over the vorticimeter 28.

Figure 4:
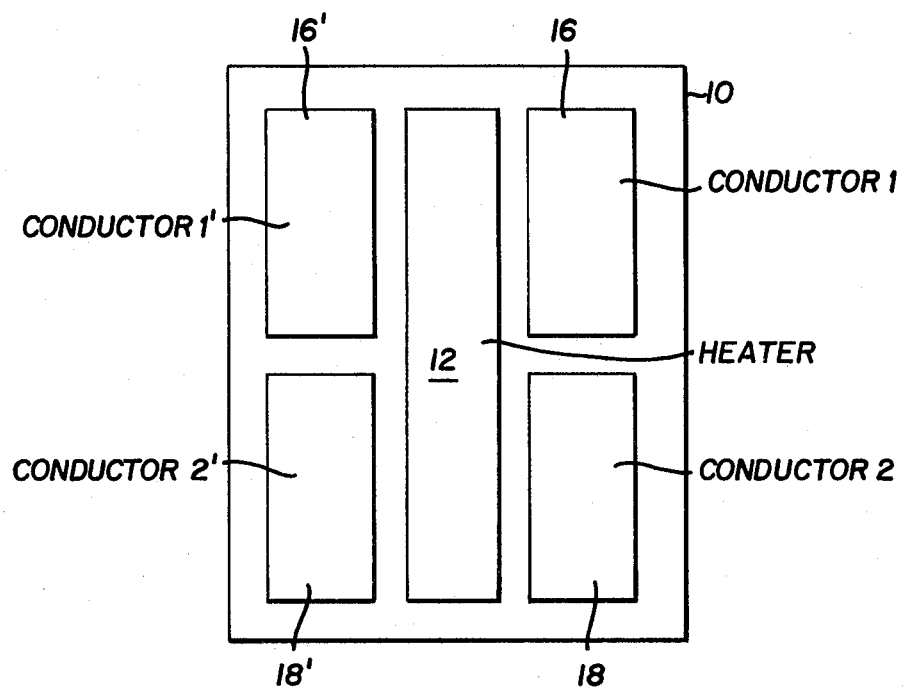
FIG. 4 is a top view of a combination pyroelectric anemometer and vorticimeter in accordance with the present invention.

Thus the shear meter shown in FIG. 1 can be utilized to produce a vorticimeter 28 as shown in FIG. 3. As discussed in the parent application, very small pyroelectric substrates can be used. Obviously any of the structures adaptable to a pyroelectric anemometer could also be used to advantage in the pyroelectric shear meter or vorticimeter. FIG. 4 is a combination of pyroelectric anenometer and vorticimeter with additional conductor elements 16' and 18' for extracting the required additional flow components. Additionally, it is known that a number of plastic films exhibit pyroelectric properties and the fabrication of a complete vorticimeter on a thin plastic film having a total area of 1 mm² or less is feasible with current technology. Although the first and second conductor elements in FIG. 1 are shown as being comprised of the same material as the heater element 12, they could be made up of any conductive material. Additionally, although a conventional nickel chromium alloy (nichrome) was used as the heater element, many other types of heating elements will be clear to those of ordinary skill in the art. Many different materials for the heater elements, conductor elements and conducting strips shown in FIG. 1 will be readily apparent to those of ordinary skill in the art in view of this disclosure and especially in view of conventional photo reduction, masking, and etching techniques currently employed for microminiature circuit applications. It may also be advantageous to combine the shear meter and/or the vorticimeter disclosed in this application with the pyroelectric anemometer disclosed in FIGS. 2 or 6 in order to completely characterize the flow field in the vicinity of the pyroelectric substrate. Such a combination would provide shear in two directions, vorticity, flow speed in two directions and the consequent flow velocity vector. The fact that these devices could be mass produced in extremely small sizes would allow such devices to be placed on aero- and/or hydrodynamic models to provide important data regarding flow characteristics thereover.

Figure 2:
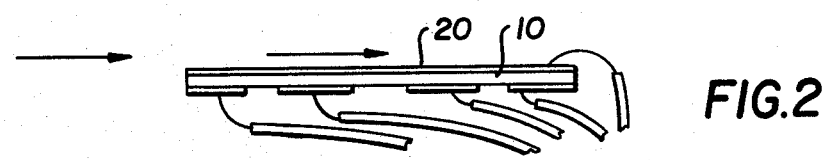
FIG. 2 is an end view of the shear meter shown in FIG. 1.

FIG. 2 illustrates the flow field passing over the common conductor 20 and it can be seen that this will cool the pyroelectric substrate essentially to the same degree as if the flow field were directly flowing over the heater element and conductor element side of the substrate. However, this embodiment has the added advantage that there is little risk of damage to the heater element or the conductor elements in the event dust and/or debris is carried across the substrate surface.

Although the invention has been described relative to a specific embodiment thereof, it is not so limited and many modifications and variations thereof will be readily apparent to those skilled in the art in light of the above teachings. It is, therefore, to be understood, that, within the scope of the appended claims, the invention may be practiced otherwise than as specifically described.

The embodiments of the invention in which an exclusive property or privilege is claimed are defined as follows:

1. A pyroelectric shear meter for providing an indication of shear flow in a given direction existent in a general flow fluid, said shear meter comprising:
    a pyroelectric substrate having at least one surface;
    means for applying a fluctuating heat input to said substrate, said input causing a fluctuating surface charge distribution in response to temperature fluctuations of said substrate; and
    at least two spaced-apart conductor element means for sensing a fluctuating surface charge on said at least one surface in the vicinity of each of said at least two conductor element means, differences in said charge fluctuations between said two conductor element means comprising an indication of shear flow in the fluid, said two spaced-apart conductor element means spaced apart at least in a direction perpendicular to said given direction and at substantially the same position in said given direction.

2. The pyroelectric shear meter according to claim 1, wherein said means for applying comprises:
    a fluctuating power supply; and
    a heater element disposed on said substrate and connected to said fluctuating power supply.

3. The pyroelectric shear meter according to claim 2, wherein said fluctuating power supply includes means for providing a sine wave output to said heater element.

4. The pyroelectric shear meter of one of claims 1 through 3 wherein said substrate is lithium tantalate (LiTaO$_3$).

5. The pyroelectric shear meter in accordance with claim 4, wherein each of said spaced apart conductor element means comprise a vapor deposited conductor element located on the same side of said substrate as said heater element and said spaced apart conductor element means further include a common conductor located such that said pyroelectric substrate is sandwiched between said common conductor and said first and second spaced apart conductor element means.

6. A pyroelectric vorticimeter for measuring vorticity in a flow of fluid, said vorticimeter comprising:
    at least one pyroelectric substrate having at least one surface;
    a first means for applying a fluctuating heat input to said substrate, said input causing a fluctuating surface charge distribution in response to temperature fluctuations of said substrate, said first means for applying having a first longitudinal axis;
    first at least two spaced apart conductor element means for sensing a fluctuating surface charge on said at least one surface adjacent said first means for applying, differences in said charge fluctuations between said first two spaced apart conductor element means comprising an indication of shear flow delta V over delta Y in the fluid where Y is a direction parallel to the longitudinal axis of said first means for applying and said first at least two spaced apart conductor element means are spaced apart in the Y direction and at substantially the same position in a direction perpendicular to said Y direction;
    a second means for applying a fluctuating heat input to said substrate, said second heat input causing a fluctuating surface charge distribution in response to temperature fluctuations of said substrate;
    second at least two spaced apart conductor element means for sensing a fluctuating surface charge on said at least one surface adjacent said second means for applying, said second means for applying having a second longitudinal axis located 90° with respect to said first means for applying longitudinal axis, differences in said charge fluctuations between said two spaced apart conductor element means adjacent said second means for applying comprising an indication of shear flow delta V over delta X where X is a direction parallel to the longitudinal axis of said second means for applying and said second at least two spaced apart conductor element means are spaced apart in the X direction and at substantially the same position in said Y direction; and
    means, responsive to said spaced apart conductor element means adjacent said first means for applying and said spaced apart conductor element means adjacent said second means for applying, for determining the difference in shear components in the X and Y directions, said difference comprising an indication of the vorticity of said fluid in the vicinity of said pyroelectric vorticimeter.

7. A pyroelectric shear meter for providing an indication of shear flow in a given direction existent in a general flow fluid, said shear meter comprising:
    a pyroelectric substrate having at least one surface;
    means for fluctuating the temperature of said substrate, said temperature fluctuation causing a fluctuating surface charge distribution in response to temperature fluctuations of said substrate;
    first conductor element means on said substrate for sensing a fluctuating surface charge distribution in said substrate adjacent said first conductor element means; and
    second conductor element means on said substrate for sensing a fluctuating surface charge distribution in said substrate adjacent said second conductor element means, said first conductor element means being spaced-apart from said second conductor element means along said substrate at least one surface, both of said element means located at substantialy the same position in said direction, differences between charge fluctuations in said conductor element means comprising an indication of shear flow in the fluid in a direction perpendicular to the seperation difference of said conductor element.

8. A method of providing an indication of shear flow in a given direction existent in a general flow of fluid, said method comprising the steps of:

providing a pyroelectric substrate having at least one surface;

applying a fluctuating heat input to said substrate, said fluctuating heat causing a fluctuating surface charge distribution in response to temperature fluctuations of said substrate; and sensing a fluctuating surface charge on said at least one surface at at least two different locations, said at least two locations being spaced apart at least in a direction perpendicular to said given direction, said differences in said charge fluctuations at said at least two locations comprising an indication of shear flow in said fluid.

9. A method of providing an indication of vorticity in a general flow of fluid, said method comprising the steps of:

providing a pyroelectric substrate having at least one surface;

applying first and second fluctuating heat inputs to portions of said substrate, said first heat input causing a fluctuating surface charge distribution in response to temperature fluctuations of a first portion of said substrate, said second heat input causing a fluctuation of surface charge distribution in response to temperature fluctuation of a second portion of said substrate;

sensing fluctuating surface charges at two spaced apart locations on said at least one surface resulting from each of said first and second heat inputs, where differences in said charge fluctuations at said spaced apart locations on said first portion comprise an indication of shear flow delta V over delta Y in the fluid, where the first two locations are spaced apart in the direction Y, where differences in said charge fluctuations at said spaced apart locations on said second portion comprise an indication of shear flow delta V over delta X in the fluid, where the second two locations are spaced apart in the direction X;

determining the difference in shear flow in the X and Y directions said difference comprising an indication of vorticity of said fluid in the vicinity of said pyroelectric substrate.

* * * * *